(12) United States Patent
Carruthers et al.

(10) Patent No.: US 8,359,151 B2
(45) Date of Patent: Jan. 22, 2013

(54) CCONVEYING TRAFFIC CONGESTION DATA TO A USER

(75) Inventors: Kenny Carruthers, San Francisco, CA (US); Justin V. Lee, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1483 days.

(21) Appl. No.: 11/376,984

(22) Filed: Mar. 15, 2006

(65) Prior Publication Data
US 2009/0143971 A1 Jun. 4, 2009

(51) Int. Cl.
G06G 7/76 (2006.01)

(52) U.S. Cl. .................. 701/119; 701/538; 701/541

(58) Field of Classification Search .............. 370/230, 370/235; 701/209–210, 119, 438, 439, 538, 701/541; 340/988–996
See application file for complete search history.

(56) References Cited

U.S. PATENT DOCUMENTS

| | | | | |
|---|---|---|---|---|
| 5,612,881 A | * | 3/1997 | Moroto et al. | 701/209 |
| 5,787,383 A | * | 7/1998 | Moroto et al. | 701/210 |
| 6,466,862 B1 | * | 10/2002 | DeKock et al. | 701/117 |
| 7,599,788 B1 | * | 10/2009 | Banerjee et al. | 701/117 |
| 2003/0052797 A1 | * | 3/2003 | Rock et al. | 340/936 |
| 2005/0231393 A1 | * | 10/2005 | Berger et al. | 340/995.13 |
| 2005/0288046 A1 | * | 12/2005 | Zhao et al. | 455/466 |
| 2006/0046732 A1 | * | 3/2006 | Grossman et al. | 455/450 |
| 2007/0150168 A1 | * | 6/2007 | Balcom et al. | 701/117 |
| 2007/0225902 A1 | * | 9/2007 | Gretton et al. | 701/202 |

OTHER PUBLICATIONS

Traffic.com, Inc., "S.F. Bay Area Traffic Report-Road Conidtions CA:: raffic.com", 2006, printed on Mar. 15, 2006, pp. 1-2, www.traffic.com/.

Metropolitan Transportatin Commission, "Traffic and Driving Times Map", 2004, pp. 2, printed on Mar. 15, 2006, traffic.511.org/.

* cited by examiner

Primary Examiner — Omar Ghowrwal
(74) Attorney, Agent, or Firm — Wolfe-SMBC

(57) ABSTRACT

A method of displaying traffic information, comprising: providing a graphical interface to display information related to traffic routes; displaying a first bar to represent a total distance of a first traffic route; and displaying segments of the first bar, each segment of the first bar representing a corresponding range of traffic speeds along the first traffic route, and each segment of the first bar located on the bar in rough proportion to where the corresponding range of traffic speeds occurs along the first traffic route.

19 Claims, 17 Drawing Sheets

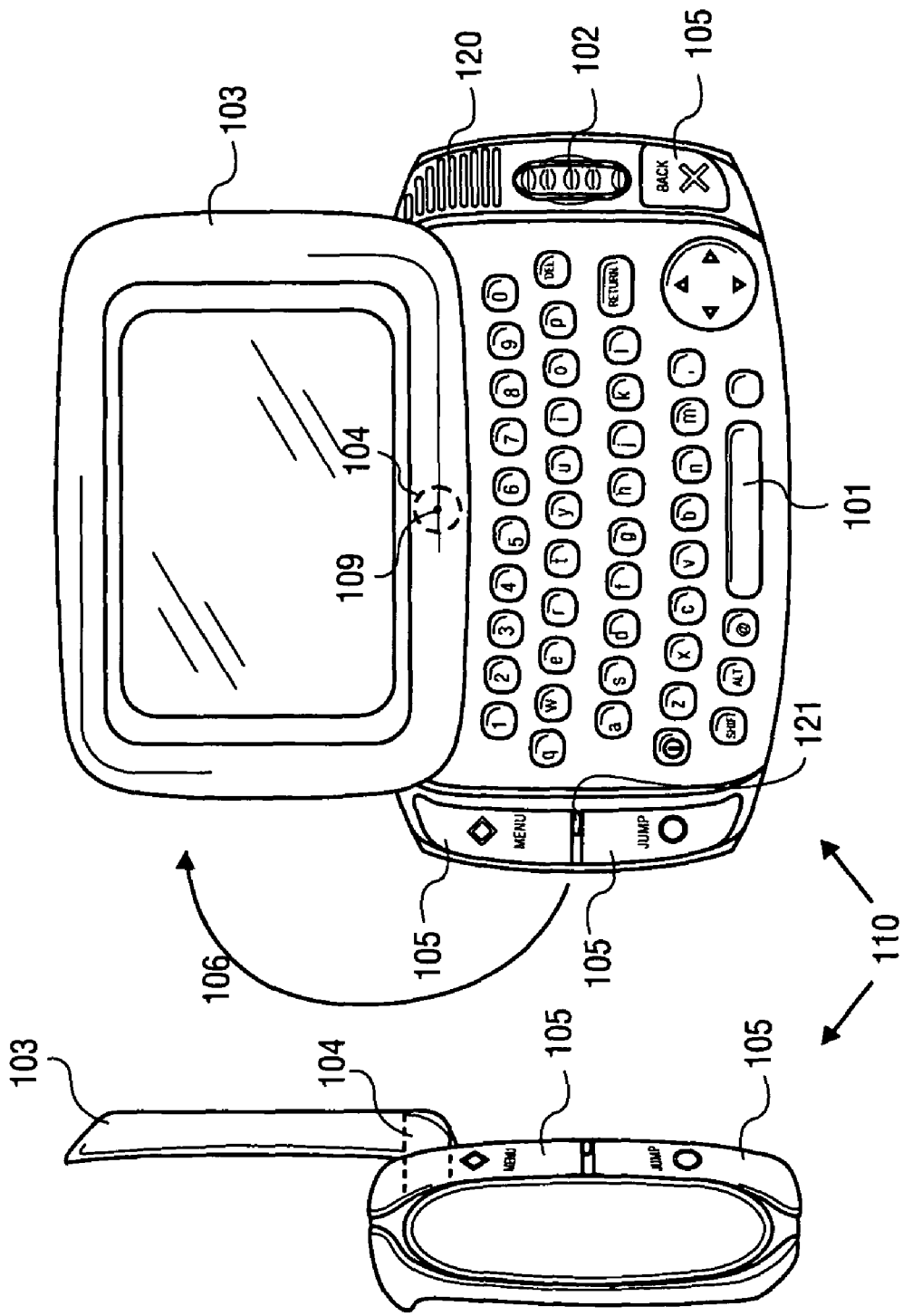

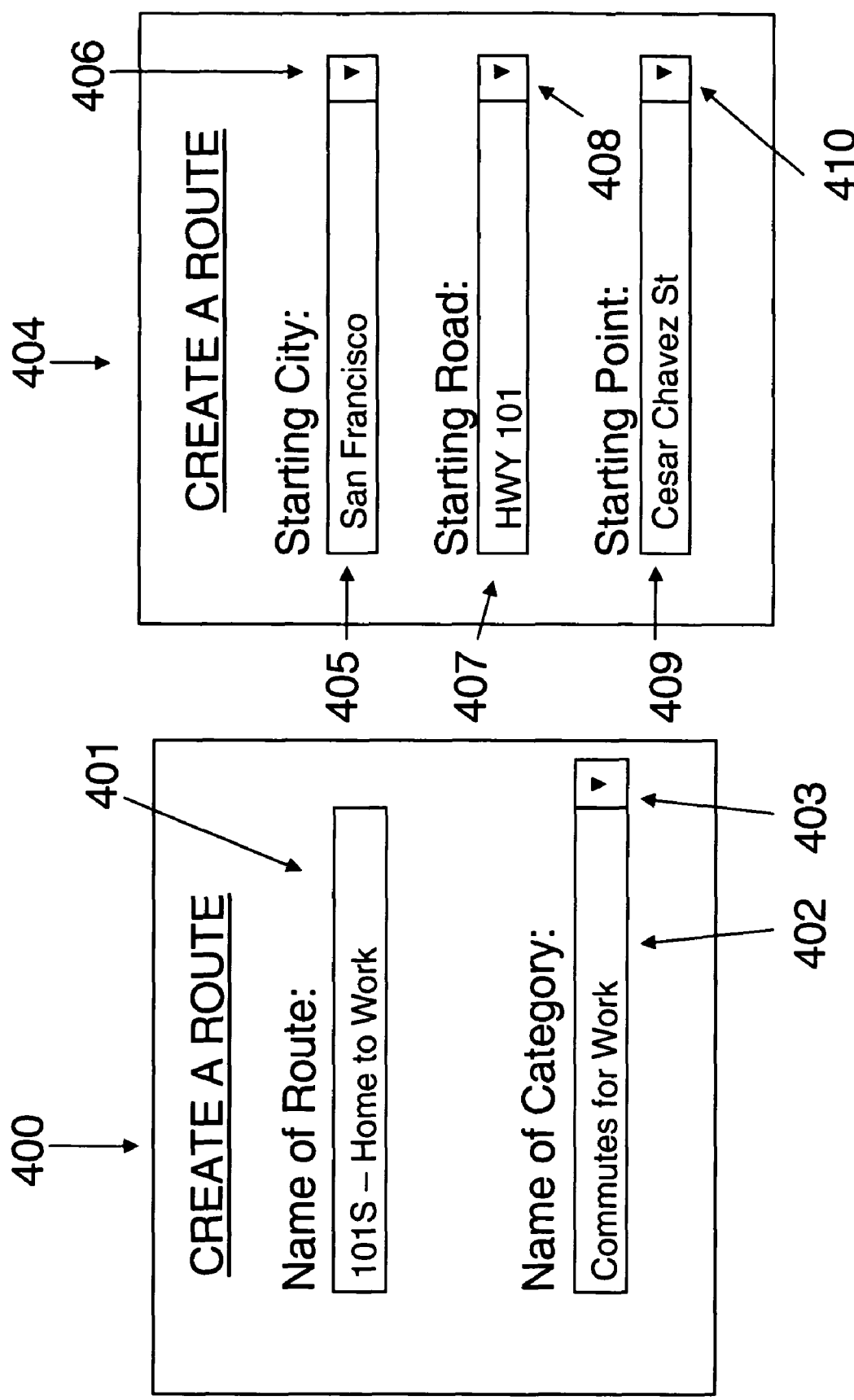

Fig. 8a (Prior Art)

CCONVEYING TRAFFIC CONGESTION DATA TO A USER

TECHNICAL FIELD

This application relates generally to the field of data processing systems. More particularly, the application relates to an improved graphical user interface for displaying traffic congestion data to a user.

BACKGROUND

Knowing traffic conditions can be very important to drivers, especially when traveling on roads with frequent congestion problems. Traffic information has traditionally been obtained through traffic reports on the television, radio, or telephone. Today, real-time traffic reports are also available through the Internet.

Systems have been implemented which monitor traffic conditions on well-traveled roadways using speed sensors. For instance, in California, loop detectors have been embedded in the pavement, as well as off the pavement, to provide traffic counts and speeds. Traffic services use these traffic counts and speeds to provide on-demand, up-to-the-minute traffic conditions and driving times.

Figure 8A:
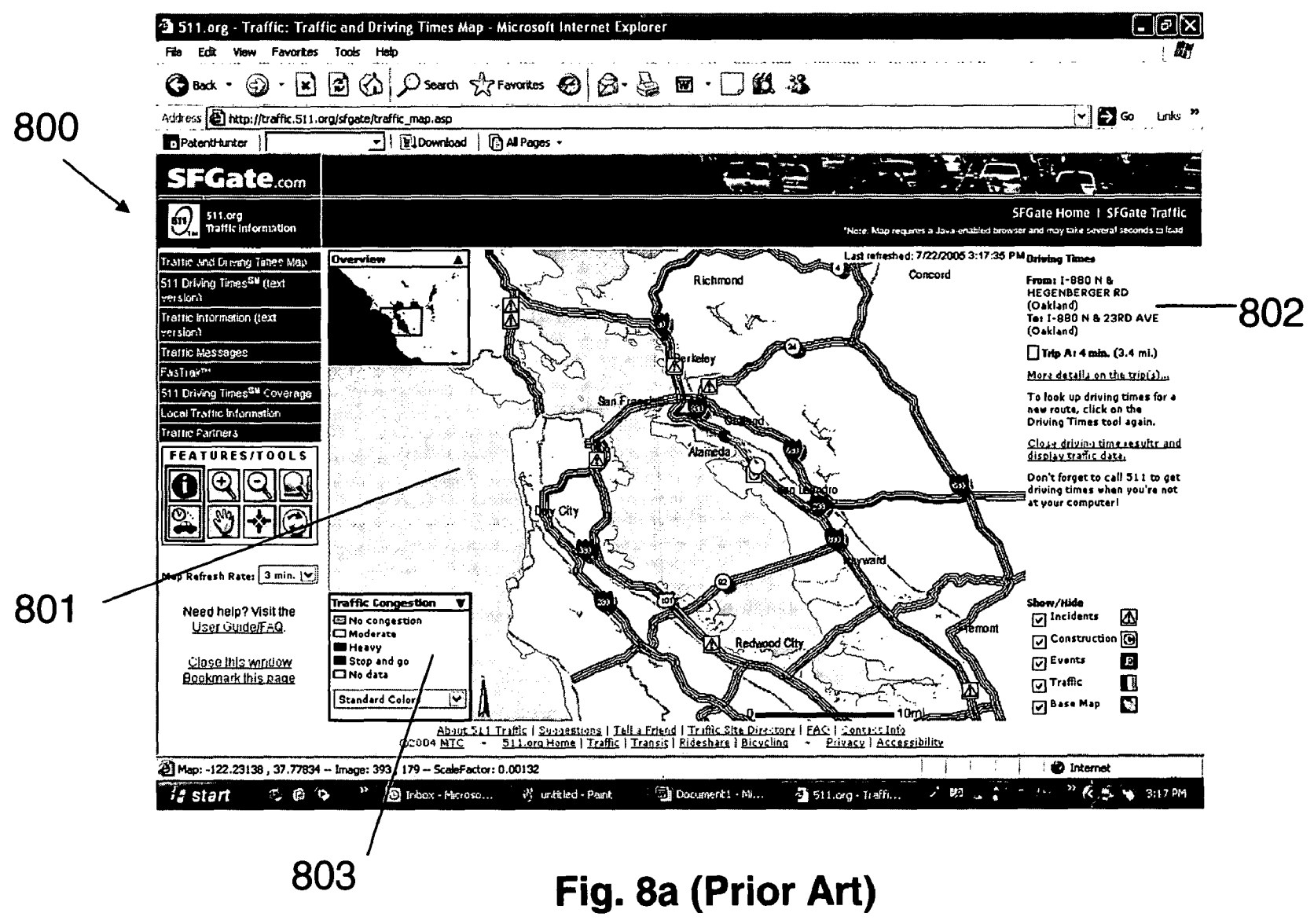

FIG. 8a illustrates a prior art traffic report currently implemented by the Website at www traffic 511 org. Within the screenshot 800 is a graphical map 801, an information box 802, and legend 803. The graphical map 801 uses colors and symbols to represent various road conditions on the major highways in the area. The information box 802 provides information related to a selected symbol or segment of the highway. FIG. 8b illustrates the prior art traffic report after zooming into a portion of the graphical map 801.

Several additional Websites provide real-time traffic information on demand, either through a text-based interface or through a graphical map. A few websites allow a user to create custom routes. For example, the Website www traffic com allows a user to create a route by connecting roadways together and selecting the beginning and ending off-ramps. This Website provides real-time information on the defined route through symbols and colors on a graphical map.

There is an increasing demand for real-time traffic updates to be readily available to drivers at all times through the use of handheld devices (e.g., personal digital assistants ("PDAs") and cell phones. Once such device is the Hiptop™ communicator designed by Danger, Inc., and distributed by T-Mobile, Inc.

However, current techniques of conveying traffic information to computers are not necessarily practical for conveying traffic information on handheld devices. For example, handheld devices are generally connected over a more bandwidth-limited network and have significantly smaller display screens. Current techniques for viewing traffic information are not only impractical, they provide too much information that is irrelevant to the user's commute. For example, current traffic maps may display an entire region, 90% of which is not interesting to the user. Or conversely, the handheld programs provide text, which is not practical at a glance. Most users require traffic information in their automobiles and need a fast-to-process GUI to make a decision.

SUMMARY

Embodiments of conveying traffic congestion data to a user provide displaying traffic data that has the quick and intuitive aspects of a map but which can be implemented on a device with a relatively small display screen.

One embodiment of the invention includes a method of displaying traffic information, comprising: providing a graphical interface to display information related to traffic routes; displaying a first bar to represent a total distance of a first traffic route; and displaying segments of the first bar, each segment of the first bar representing a corresponding range of traffic speeds along the first traffic route, and each segment of the first bar located on the bar in rough proportion to where the corresponding range of traffic speeds occurs along the first traffic route.

BRIEF DESCRIPTION OF THE DRAWINGS

A better understanding of the present invention can be obtained from the following detailed description in conjunction with the following drawings, in which:

FIGS. 1b-d illustrate an exemplary client device on which embodiments of the invention may be implemented.

FIGS. 4a-b illustrate one embodiment of an interface used to create a traffic route request from a client device in accordance with the present invention.

FIG. 7b illustrates one embodiment of navigation through the interface to reach the window of FIG. 7a.

FIG. 8a illustrates a prior art interface for displaying traffic information using a graphical map.

FIG. 8b illustrates a prior art interface displaying a zoomed-in image of a section of the graphical map in FIG. 8a.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of A Data Processing Service

Figure 1A:
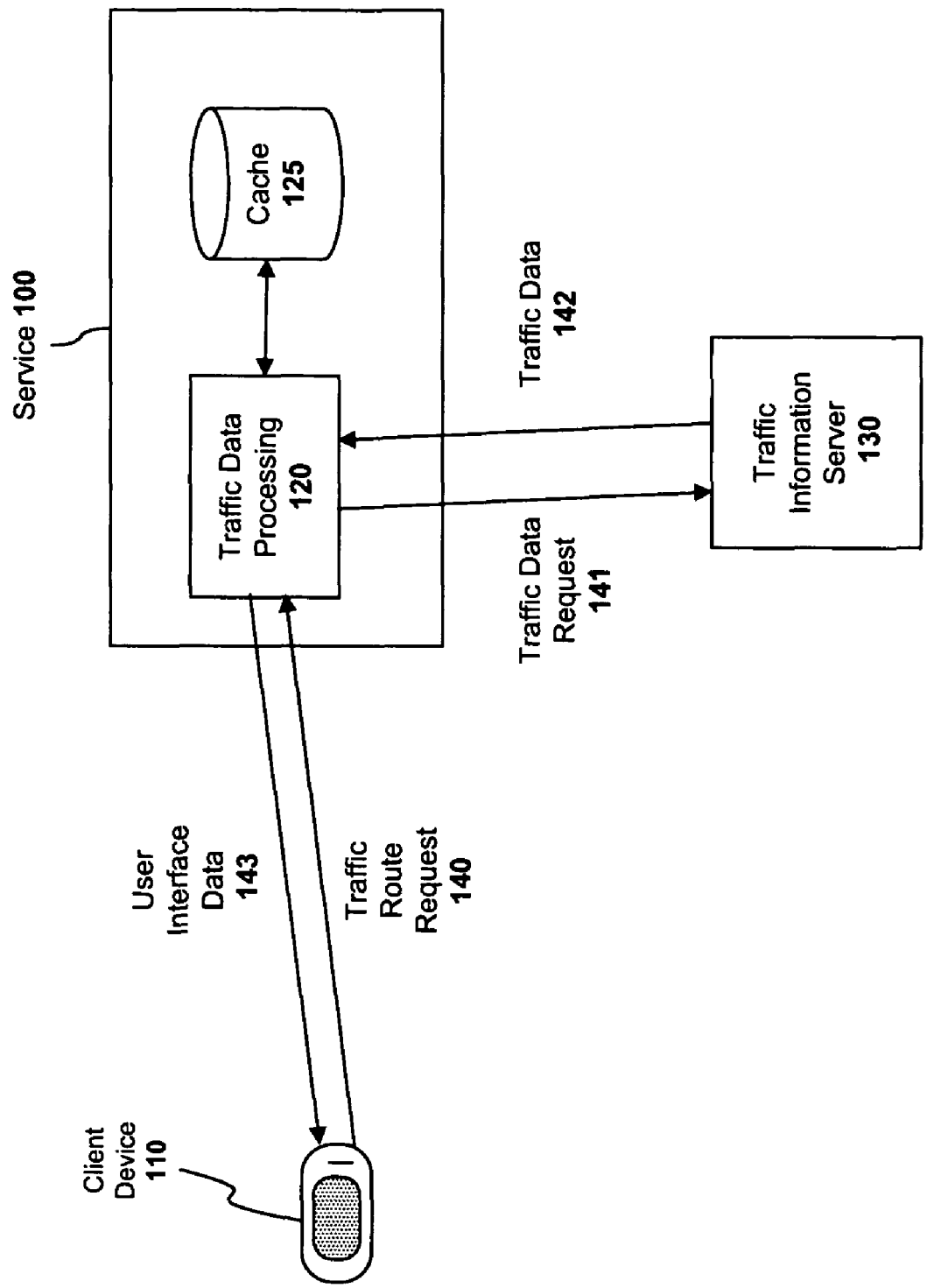
FIG. 1a illustrates a system for displaying traffic congestion data to a client device according to one embodiment of the invention.

Embodiments of the invention may be implemented on a wireless client device 110 which communicates with a data processing service 100 as illustrated generally in FIG. 1*a*. Certain features of the service 100 and an exemplary client device 110 will now be described followed by a detailed description of a user interface for conveying traffic information to a client device. It should be noted, however, that the embodiments of the invention described below may be implemented on virtually any type of data processing device including standard personal computers, personal digital assistants and wireless telephones.

FIG. 1*a* illustrates one embodiment where the service 100 includes traffic data processing logic 120 and a cache 125. The traffic data processing logic 120 is configured to covert traffic data into user interface data for the client device 110. As illustrated in FIG. 1*a*, the service 100 receives a traffic route request 140 from the client device 110 for a particular traffic route. After receiving the traffic route request 140, the traffic data processing logic 120 transmits a traffic data request 141 to a traffic information server 130 (e.g., formatted as a standard HTTP client request). For example, in response to a traffic route request from San Francisco to Sunnyvale using Highway 101, the service 100 requests only the specific traffic data for Highway 101 from San Francisco to Sunnyvale. In response, the traffic information server 130 sends the corresponding traffic data 142 to the service 100. The traffic data 142 may consist of sensor identification information (identifying the sensors from which the speed of the traffic was measured) and corresponding speeds. Upon receiving the traffic data 142, the traffic data processing logic 120 within the service 100 generates user interface data 143 from the traffic data 142 and then transmits the user interface data 143 to the client device 110.

An Exemplary Client Device

Figure 1B:
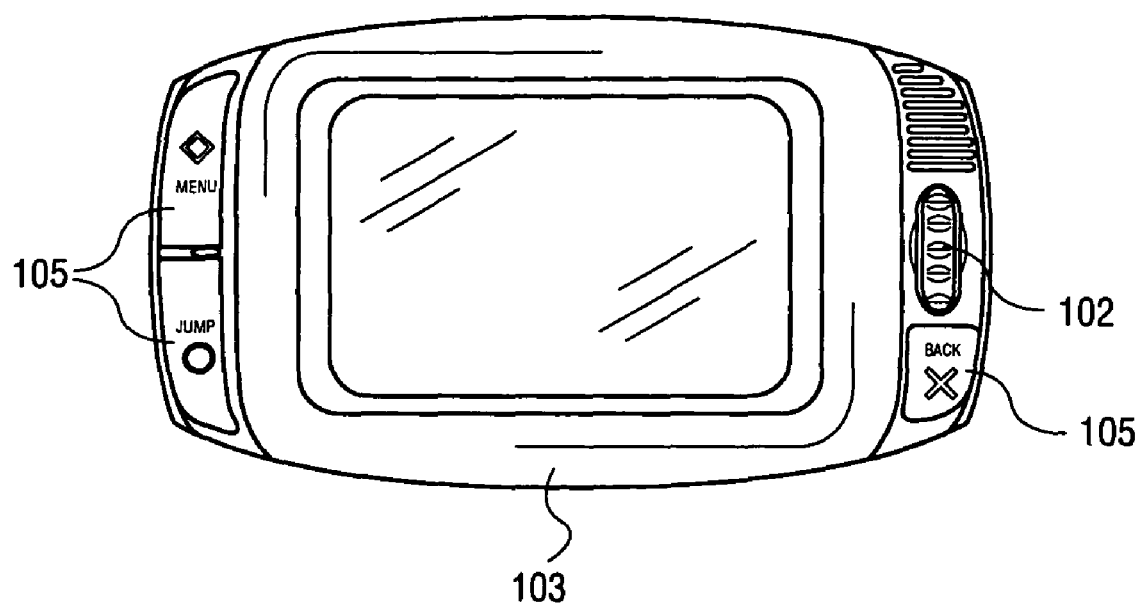

An exemplary client device on which embodiments of the invention are implemented is illustrated in FIGS. 1*b-d*. The client device 110 includes a keyboard 101, a control knob/wheel 102 (e.g., for scrolling between menu items and/or data), and a set of control buttons 105 (e.g., for selecting menu items and/or data).

The display 103 is pivotally coupled to the client device 110 and pivots around a pivot point 109, located within a pivot area 104, from a first position illustrated in FIG. 1*b* to a second position illustrated in FIGS. 1*c-d*. When in the first position the display 103 covers the keyboard 101, thereby decreasing the size of the device 110 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1*b-c*. As illustrated, when in the second position, the keyboard 101 is fully exposed. Accordingly, the display is viewable, and data is accessible by the user in both a the first position and the second position (although access to the keyboard is only provided in the first position).

In one embodiment, the client device 110 is also provided with audio telephony (e.g., cellular) capabilities. To support audio telephony functions, the embodiment illustrated in FIGS. 1*b-d* includes a speaker 120 for listening and a microphone 121 for speaking during a telephone conversation. Notably, the speaker 120 and microphone 121 are positioned at opposite ends of the data processing device 110 and are accessible when the screen 103 is in a closed position and an open position.

A Graphical Interface For Displaying Traffic Congestion Data

Figure 2A:
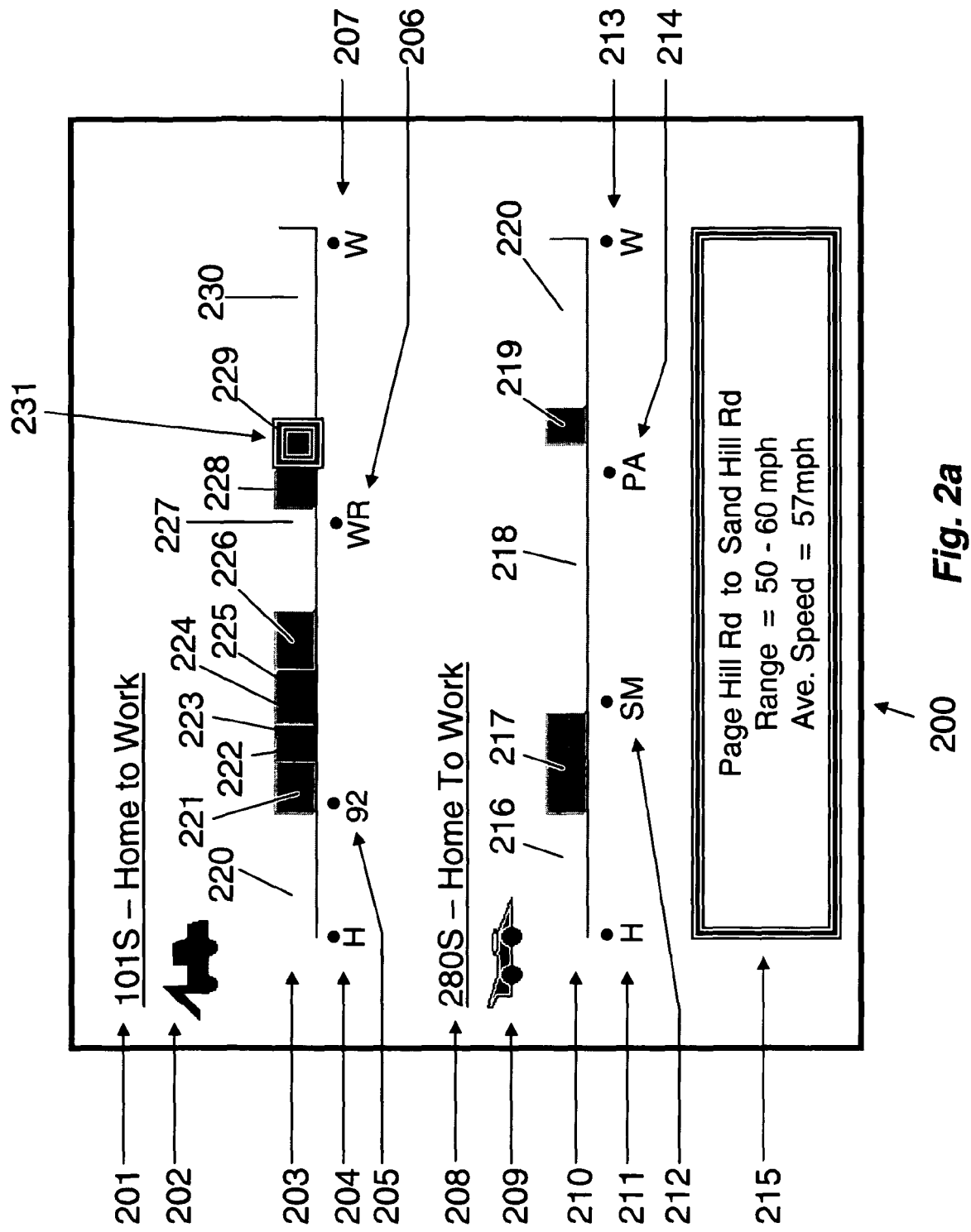
FIG. 2a illustrates one embodiment of an interface used to convey traffic congestion data to a user in accordance with the present invention.

FIG. 2*a* illustrates an interface 200 for displaying traffic congestion data according to one embodiment of the invention. A first traffic route bar 203 is shown divided into multiple segments 220-230 with a focus graphic 231 highlighting segment 229. A route name 201, status symbol 202, and location markers 204-207 of the first traffic route corresponding to the first traffic route bar are also shown. A second traffic route bar 210 is also shown divided into multiple segments 216-220 as well as a second route name 208, a status symbol 209, and location markers 211-214 for the second traffic route. An information focus box 215 is illustrated which provides details associated with the segment 229 highlighted by the focus graphic 231.

The first traffic route bar 203 represents a first traffic route entered by a user. In this particular example, the user wishes to display a route from the user's home (San Francisco) to the user's work (Sunnyvale) using highway 101 south. The first traffic route name 201 may be user-defined, e.g., "101S—Home to Work." In one embodiment, the relative lengths of the traffic bar segments 220-230 is proportional to the actual distances represented by the segments within of the first traffic route. For example, the first one-third of the first traffic route bar 203 corresponds to the first one-third of the first traffic route, the second one-half of the first traffic route bar 203 to the second one-half of the first traffic route, etc.

Each of the segments 220-230 within the first traffic route bar 203 represents a range of traffic speeds along the corresponding locations of the first traffic route. Each range of traffic speed can be represented by various symbols, colors, numbers, etc. In the embodiment illustrated in FIG. 2*a*, yellow is used to represent 55+ mph traffic (segments 220,227, 230); orange for 40-55 mph traffic (segments 221,226,229); red for 20-40 mph traffic (segments 222,224); red for 5-20 mph traffic (segments 225,228); and black for 0-5 mph traffic (segment 223). Since segment 220 is yellow and approximately the first one-fifth of the total distance of the bar, it therefore represents 60-70 mph traffic for approximately the first one-fifth of the first traffic route. By contrast, segment 223 is black and represents traffic at a near standstill at a point approximately one-third into the first traffic route.

In one embodiment of the invention, the traffic route bar includes symbols in addition to or in lieu of colors to represent ranges of traffic speeds for each segment. For example, FIG. 2*b* illustrates a traffic route bar 250 which is shown with two symbols—arrow symbol 251 to represent 55+ mph traffic, and triangle symbol 252 to represent 40-55 mph traffic.

Returning to FIG. 2*a*, the second traffic route bar 210 represents a second traffic route programmed by the user. In this example, the user has created an alternative route from the user's home (e.g. in San Francisco) to the user's work (e.g. in Sunnyvale)—this time via interstate 280 south. The second traffic route bar 210 and its segments 216-220, along with the second traffic route name 208 and location markers, are represented in a similar fashion as explained for the first traffic route bar 203 above. Segments 216, 218, and 220 are yellow and represent 55+ mph traffic along the corresponding location of the second traffic route, while segments 217, 219 are orange and represent 40-55 mph traffic along the corresponding locations of the second traffic route.

Figure 2B:
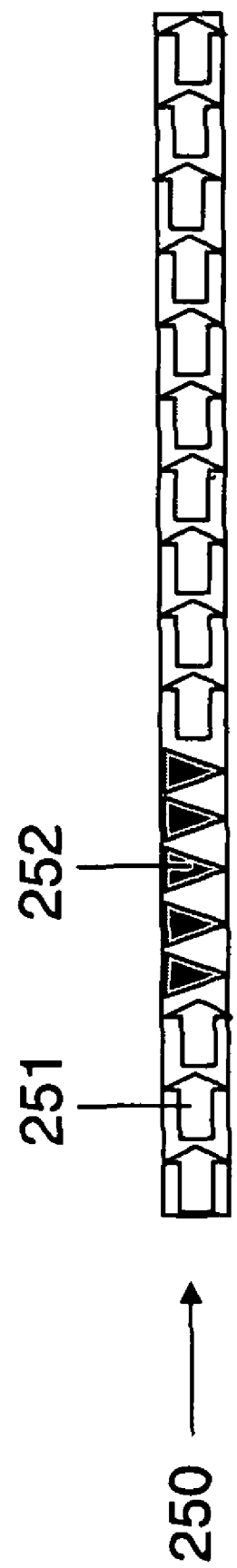
FIG. 2b illustrates one embodiment of a traffic route bar using symbols to identify ranges of traffic speeds along a traffic route in accordance with the present invention.

The user interfaces shown in FIGS. 2a-b provide a straightforward, intuitive scheme for identifying problem areas of traffic. Generally, areas with many small segments adjacent to one another represent traffic congested areas because of the frequent changing traffic speeds. Moreover, the color-coded scheme shown in FIG. 2a allows users to quickly identify congested areas. Although a segment's location on the bar provides a rough idea of where it is on the traffic route, location markers 204-207 may be used to help make the locations of the segments even more intuitive. In the example illustrated in FIG. 2a, Location marker 204 is the letter "H" and represents the starting point at home. Location marker 205 is the number "92" and represents the Highway 92 junction along the first traffic route. Location marker 206 is the letters "WR" and represents the Willow road exit. And lastly, location marker 207 is the letter "W" and represents the ending point at work. Similarly, location markers 211-214 identify various points along the second traffic route. Location marker 212 is "SM" and represents San Mateo, while location marker 214 is "PA" and represents Palo Alto.

The location markers may be named and placed by the service 100 and/or may be customizable by the user. For example, the number of location markers, the type of location marker (e.g. letters, numbers, symbols, etc), and the placement of the location markers may be specified by the user and/or by the service 100. The location markers are typically placed such as to identify key locations such as a city, an off-ramp, a common traffic-congested area, etc. For instance, in the exemplary embodiment shown in FIG. 2a, location markers 211-214 are placed by service 100 along the second traffic route bar 210 to divide the second traffic route into thirds. By contrast, location marker 205 is selected by the user in order to mark a common traffic-congested area at the Highway 92 junction along Highway 101, while location marker 206 was selected by the service 100 in order to identify an area with a rapid decrease in speed.

Additionally, in one embodiment, status symbols for traffic routes may be displayed to represent the general traffic status of a traffic route. The status symbols are not limited to symbols, but may include letters, numbers, pictures, icons, etc. In the exemplary embodiment in FIG. 2a, status symbol 202 is a tow truck icon to indicate that the first traffic route is having severe traffic problems. On the other hand, status symbol 209 is a race car to indicate that the second traffic route is moving quickly.

Users may wish to retrieve more detailed information on a particular segment. In the exemplary embodiment illustrated in FIG. 2a, a focus graphic 231 is shown highlighting segment 229 while detailed information related to the segment is displayed within the focus box 215. In one embodiment, the focus graphic may be scrolled sequentially from one segment to the next using the input controls on the data processing device, e.g., the keypad 101, directional pad, control wheel 102, or any other control button. For example, in one embodiment, the user may conveniently turn the control wheel 102 to scroll sequentially to the left or right through each segment of the traffic route bars 203, 210. In the exemplary embodiment shown in FIG. 2a, the focus box 215 is shown displaying the beginning and end of the segment, the range of speed within the segment, and the average speed within the segment. It should be noted, however, that the detailed information that can be displayed in the focus box 215 is not meant to be limited to the specific information shown. Any detailed information regarding the focus may be displayed in the focus box 215. In one embodiment, an accident report may also be displayed in the focus box 215 if an accident has occurred. Furthermore, in one embodiment, the focus box 215 appears only in response to a user request. In yet another embodiment, the focus box 215 appears in an overlaying window or in its own separate interface window. In one embodiment, information from public domain feeds such as California highway patrol reports and 511 traffic reports is gathered together and provided within a single traffic GUI. In this embodiment, at a glance, a tow truck will indicate an "accident" on the user's route. The user may not require the details in some cases (i.e., some routes such as bridges handle accidents worse than others). However, in one embodiment, the user may select the graphic representing the accident to view the details associated with the accident.

Figure 3:
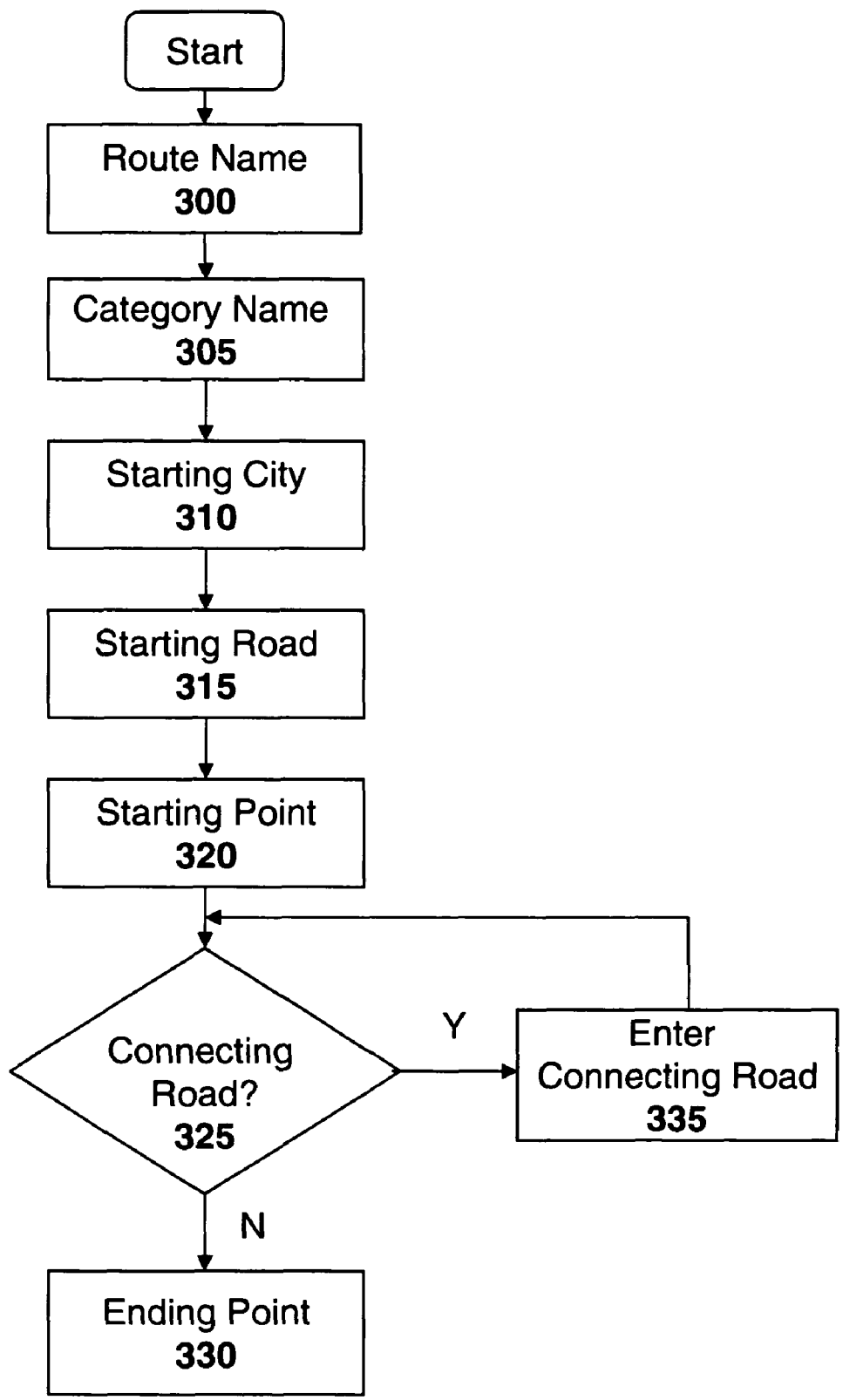
FIG. 3 is a block diagram illustrating one embodiment of a process to create a traffic route request from a client device in accordance with the present invention.

FIG. 3 illustrates a block diagram of an exemplary process for creating a traffic route. At 300, the user begins by naming the traffic route. At 305 the user selects a category in which the route should be placed. The user can either select from a list of existing categories or create and name a new category. For instance the traffic route, "101S—Home to Work" may be created within a category called "Work Commutes," where other routes for commutes to work may also be stored. Next, at 310, the user selects the city in which to begin the traffic route. At 315, after selecting the desired city to start the traffic route, the user selects from a list of starting roads for the desired city. At 320, the user selects from a list of starting points on the starting road. At 325, the user decides whether to connect to another road. If not, then at 330 the user chooses an ending point on the starting road. If the user decides to connect another roadway, then at 335 the user chooses from a list of connecting roads. After choosing another road, the user again decides whether to connect to another road at 325. If so, then the processes back to 335 where the user will again choose from a list of connecting roads. If, however, the user does not wish to connect to another road, then the user will select an ending point at 340.

FIG. 4a illustrates an exemplary embodiment of an interface 400 used at 300,305 from FIG. 3. Box 401 is an entry box where the user can type in the name of a route he wishes to create. In this example, the user has typed in "101S—Home to Work" as the name of the route. Box 402 is an entry box where the user can type in the name of a new category or alternatively select a pull down menu button 403 for already existing categories. In this example, the user has created the route in the category called "Commutes to Work" where other commutes to work may be stored.

FIG. 4b illustrates an exemplary embodiment of an interface 404 used at 310, 315, 320 from FIG. 3. Box 405 is an entry box for entering a starting city, and pull down menu button 406 allows the user to select from a list of starting cities. In this example, the user has selected San Francisco as a starting city. Box 407 is an entry box for entering a starting road, and pull down menu button 408 allows the user to select from a list of starting roads. In this example, the user has selected Highway 101 as the starting road. Similarly, Box 409 is an entry box for entering a starting point, and pull down menu button 410 allows the user to select from a list of starting points. In this example, the user has select Cesar Chavez Street as the starting point on Highway 101 in San Francisco.

Figure 5A:
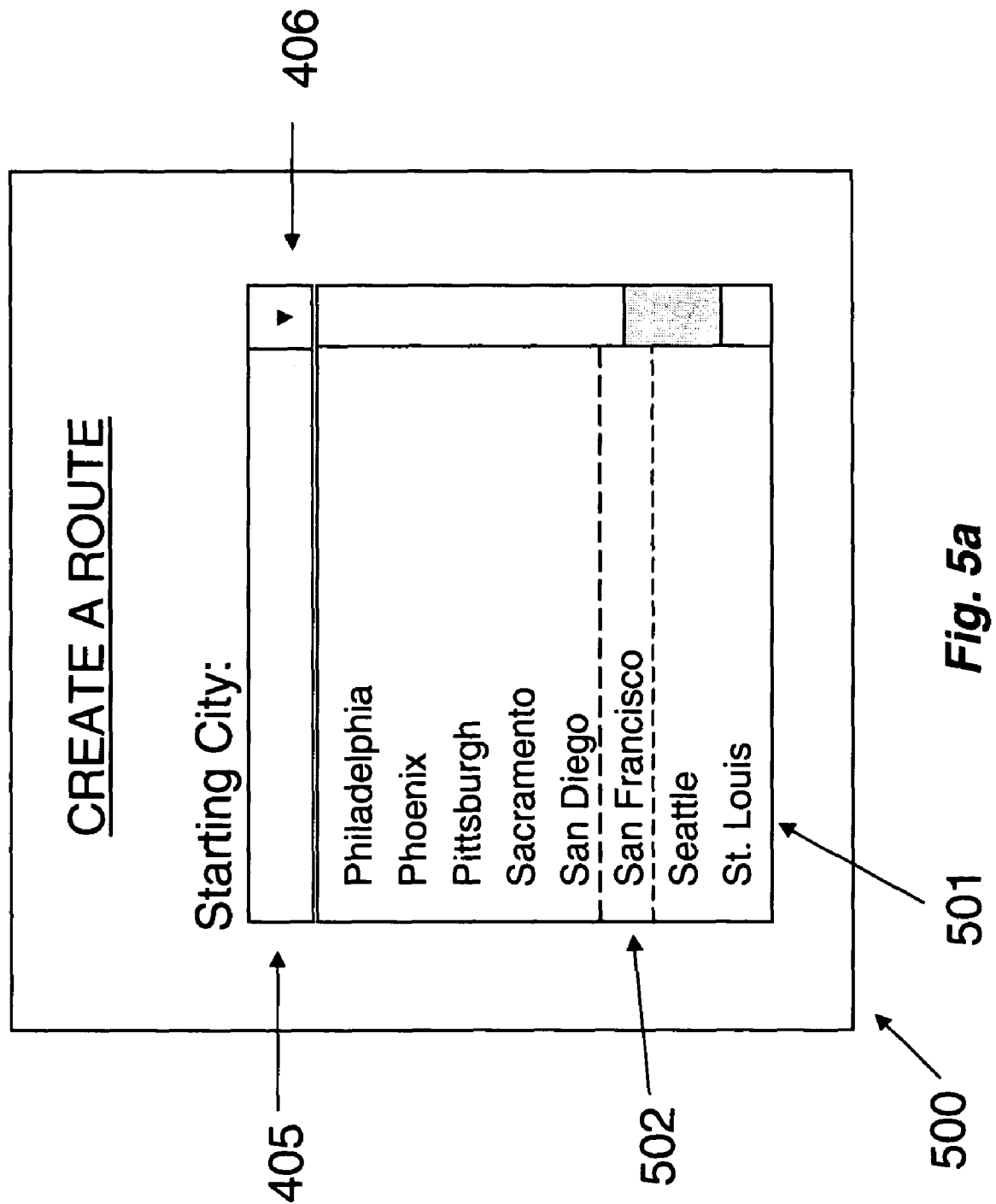
FIG. 5a illustrates one embodiment of an interface for entering a starting city for a traffic route request in accordance with the present invention.

FIG. 5a illustrates an exemplary embodiment of an interface 500 displaying a pull down menu 501 for entry box 405 which provides a list of starting cities. Selector 502 is shown highlighting San Francisco. The user may move the selector to different cities by any number of methods, e.g., by scrolling the control wheel 102 or selecting keys within the keypad 101. For example, in one embodiment, the user may turn the control wheel 102 to scroll sequentially in either direction through the list of cities. Similarly, in FIG. 5b, selector 505 is shown highlighting Highway 101 from the list of starting roads in the pull down menu 504, and in FIG. 5c, selector 508 is shown highlighting Cesar Chavez Street from a list of starting points in the pull down menu 507.

Figure 6A:
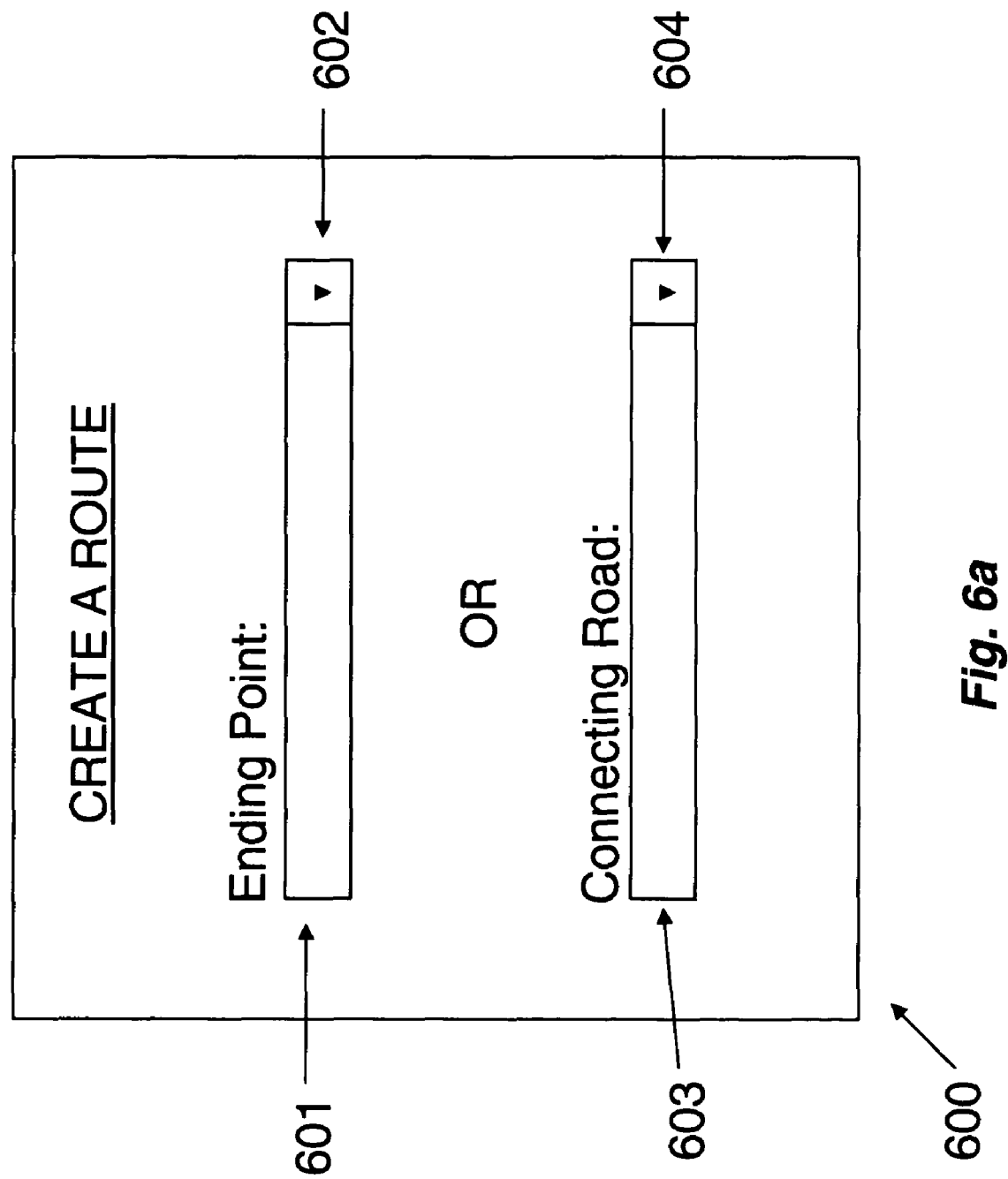
FIG. 6a illustrates one embodiment of an interface used to enter an ending point or connecting road for a traffic route request from a client device in accordance with the present invention.

FIG. 6a illustrates an exemplary embodiment of an interface 600 used at 325, 335 of FIG. 3, where the user connects to another road or chooses an ending point. Box 601 is an entry box for entering an ending point, and pull down menu button 602 allows the user to select from a list of ending points. Box 603 is an entry box for entering connecting roads, and pull down menu button 604 allows the user to select from a list of connecting roads.

Figure 5B:
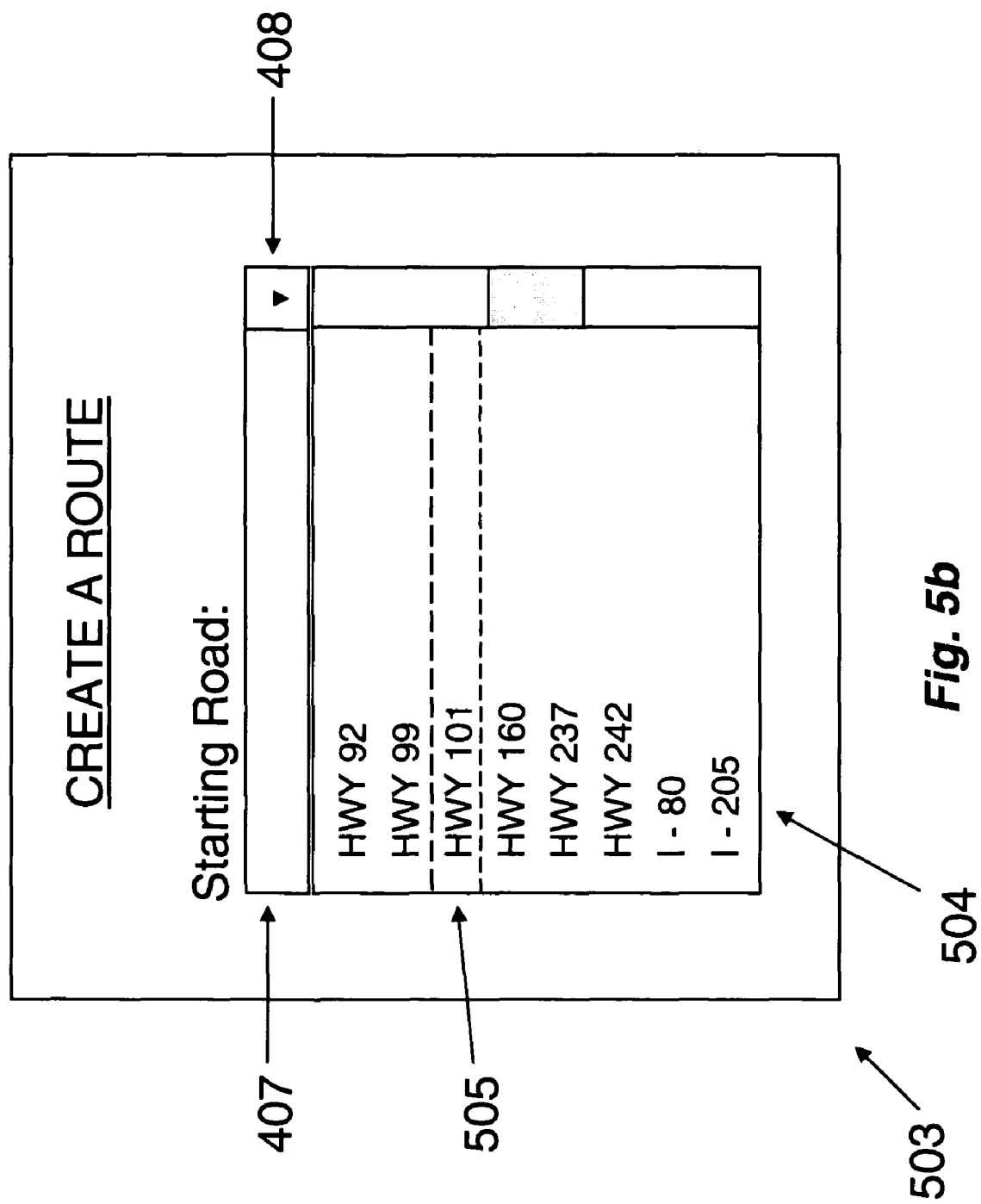
FIG. 5b illustrates one embodiment of an interface for entering a starting road for a traffic route request in accordance with the present invention.
Figure 5C:
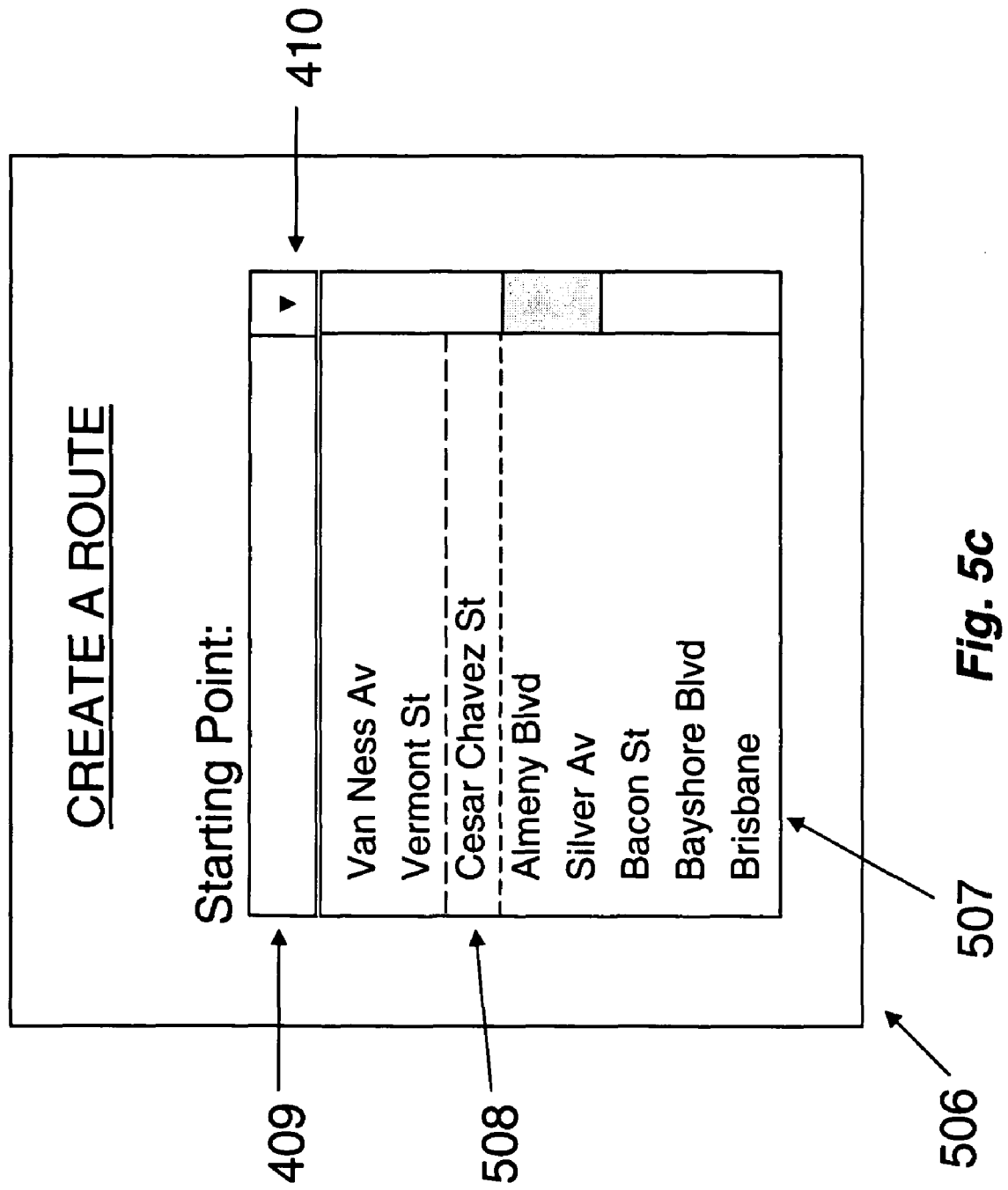
FIG. 5c illustrates one embodiment of an interface for entering a starting point for a traffic route request in accordance with the present invention.
Figure 6B:
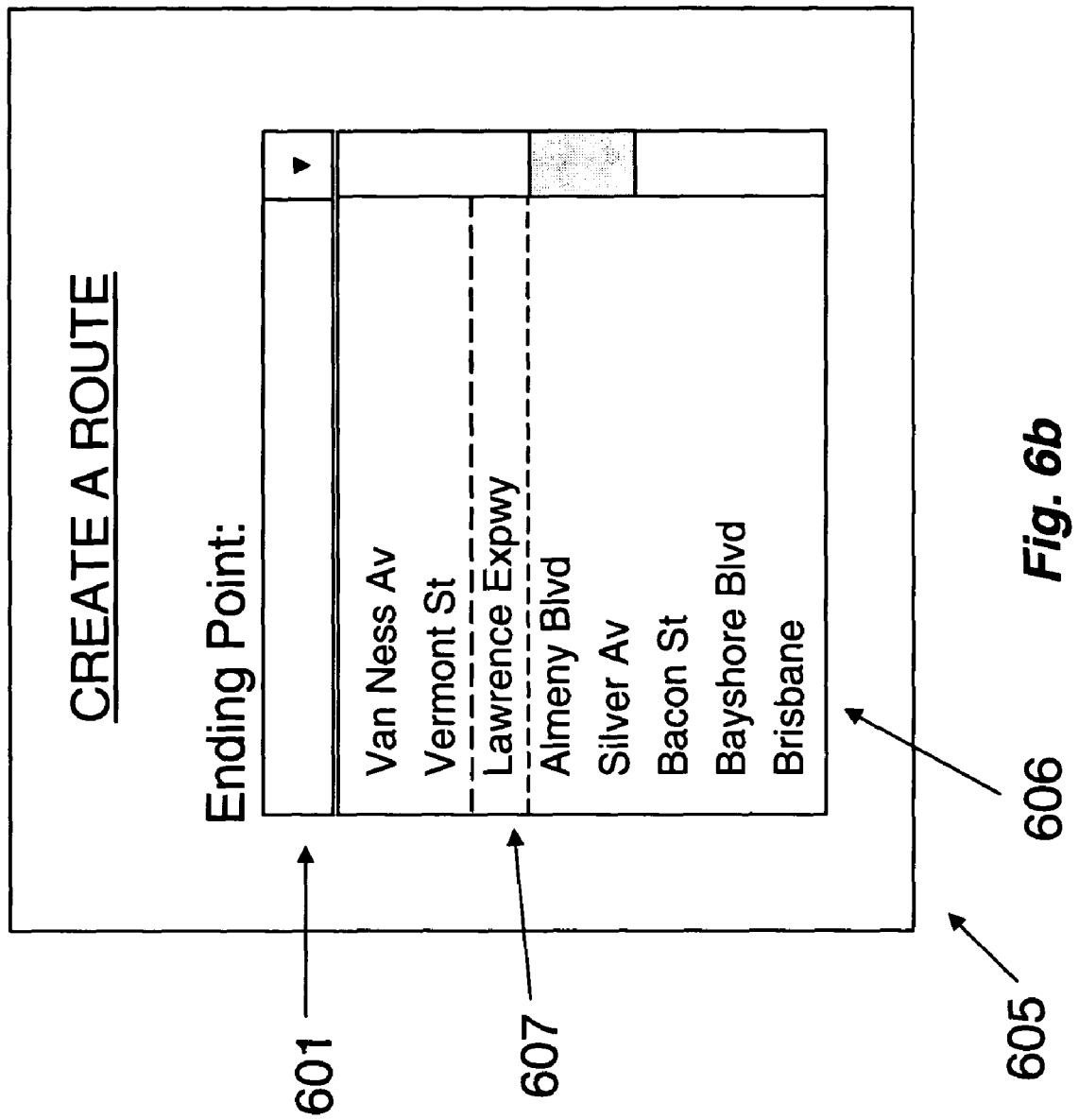
FIG. 6b illustrates one embodiment of an interface for entering an ending point for a traffic route request in accordance with the present invention.
Figure 6C:
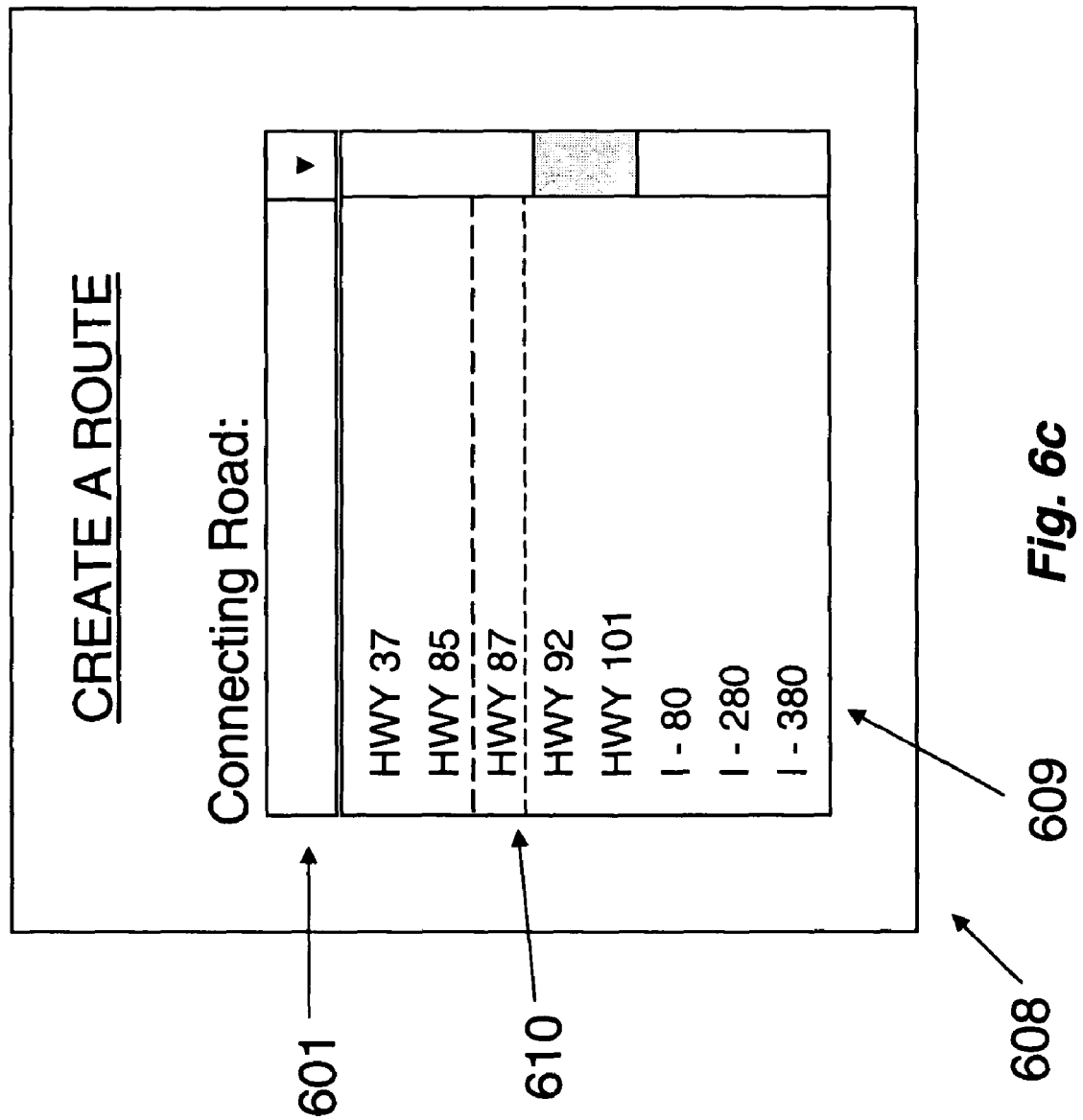
FIG. 6c illustrates one embodiment of an interface for entering a connecting road for a traffic route request in accordance with the present invention.

FIG. 6b illustrates an exemplary embodiment of an interface 605 for selecting an ending point for entry box 601. As shown in FIGS. 5a-c, selector 607 is shown highlighting Lawrence Expressway from a list of ending points in the pull down menu 606. Similarly, FIG. 6c illustrates an exemplary embodiment of an interface 608 for selecting a connecting road for entry box 603. Selector 610 is shown highlighting Highway 87 from a list of connecting roads in the pull down menu 609. In this example, Highway 87 is the connecting road to Highway 101.

In the exemplary embodiments of FIGS. 4-6 discussed above, the starting and ending points have been on-ramps and off-ramps to highways or interstates. Likewise, the connecting roads were highways or interstates. Currently, the sensor technology employed have been mainly incorporated into major highways, interstates, or roadways. However, as technology develops and becomes capable of approximating real-time speeds of traffic on city streets, the scope can be easily understood to encompass starting and ending points of physical street addresses, as well as roadways that encompass city streets.

Figure 7A:
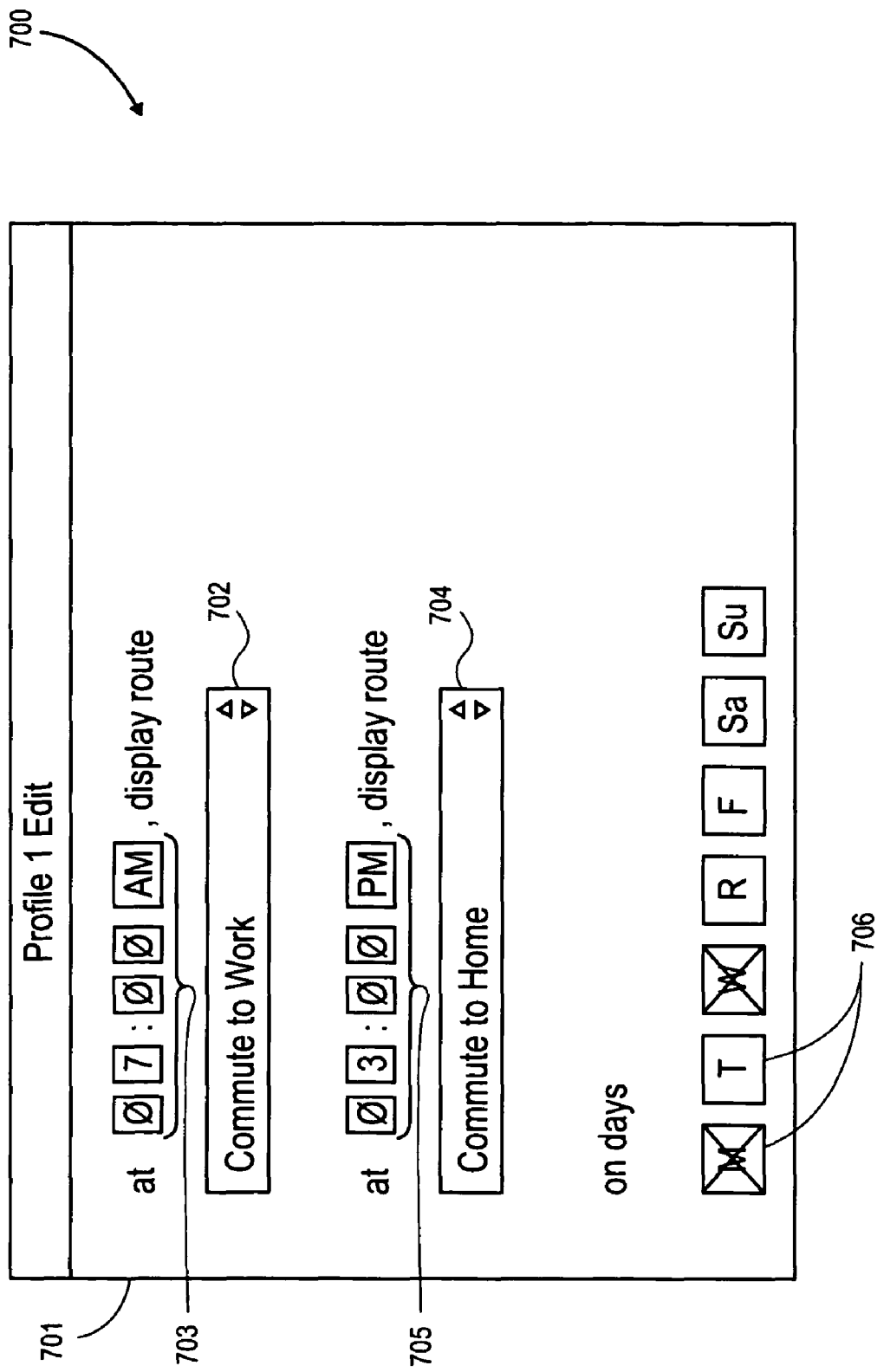
FIG. 7a illustrates one embodiment of a window of an interface for editing a profile in accordance with the present invention.

FIG. 7a illustrates an exemplary embodiment of an interface 700 for editing a profile of a user. A profile contains information about when and what routes are automatically started by the device. For example, in the exemplary embodiment, the "Profile 1 Edit" window 701 of the interface 700 displays a "Commute to Work" route 702 which starts at 7:00 am (706) on Monday and Wednesday (712) for a user's commute from home to the office. Upon display of edit window 701, the user may edit the route 702,708 by highlighting the route 702,708 and scrolling through the other routes available for selection (e.g., "Commute Home" 708). In addition, the user may also edit the time 703, 705 and days of the week 706 through the previously described method or by entering the time per each digit. It will be obvious to one skilled in the art that the different parameters of the profile may be changed through a variety of other ways such as, but not limited to, displaying a drop-down menu or pop-up menu with options from which the user may select (e.g., a pop-up menu displaying all routes selectable by the user when route 702 is selected). Other embodiments of the present invention may also have the ability to switch to more than or less than two predetermined categories in a day. In addition, other embodiments of the present invention may allow the user to select days, or other increments of time, along a scale other than a week as shown by 706 on FIG. 7a (e.g., a month may be shown for days to select or a calendar may be shown to select days and/or weeks).

Figure 7B:
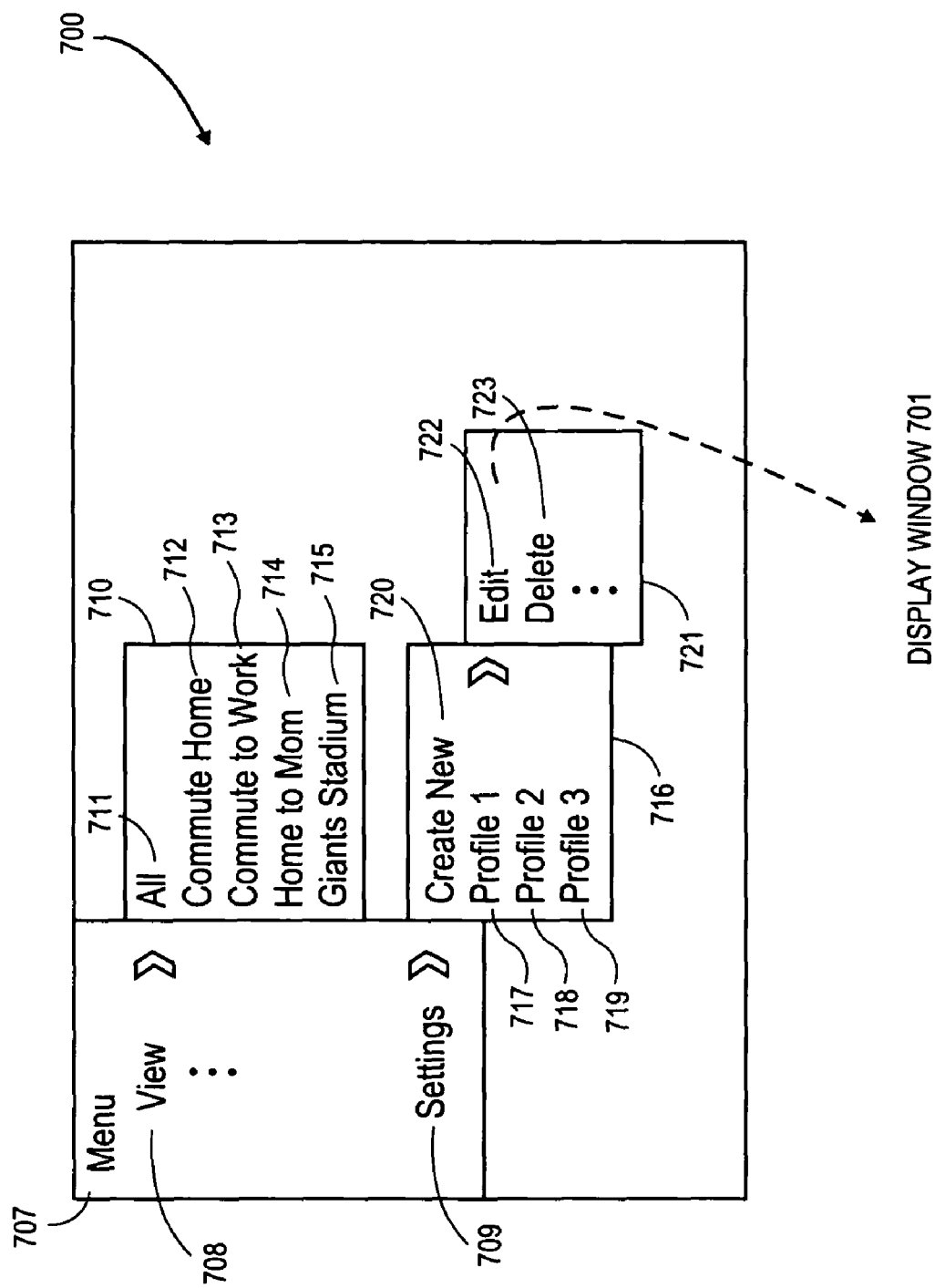
Figure 8B:
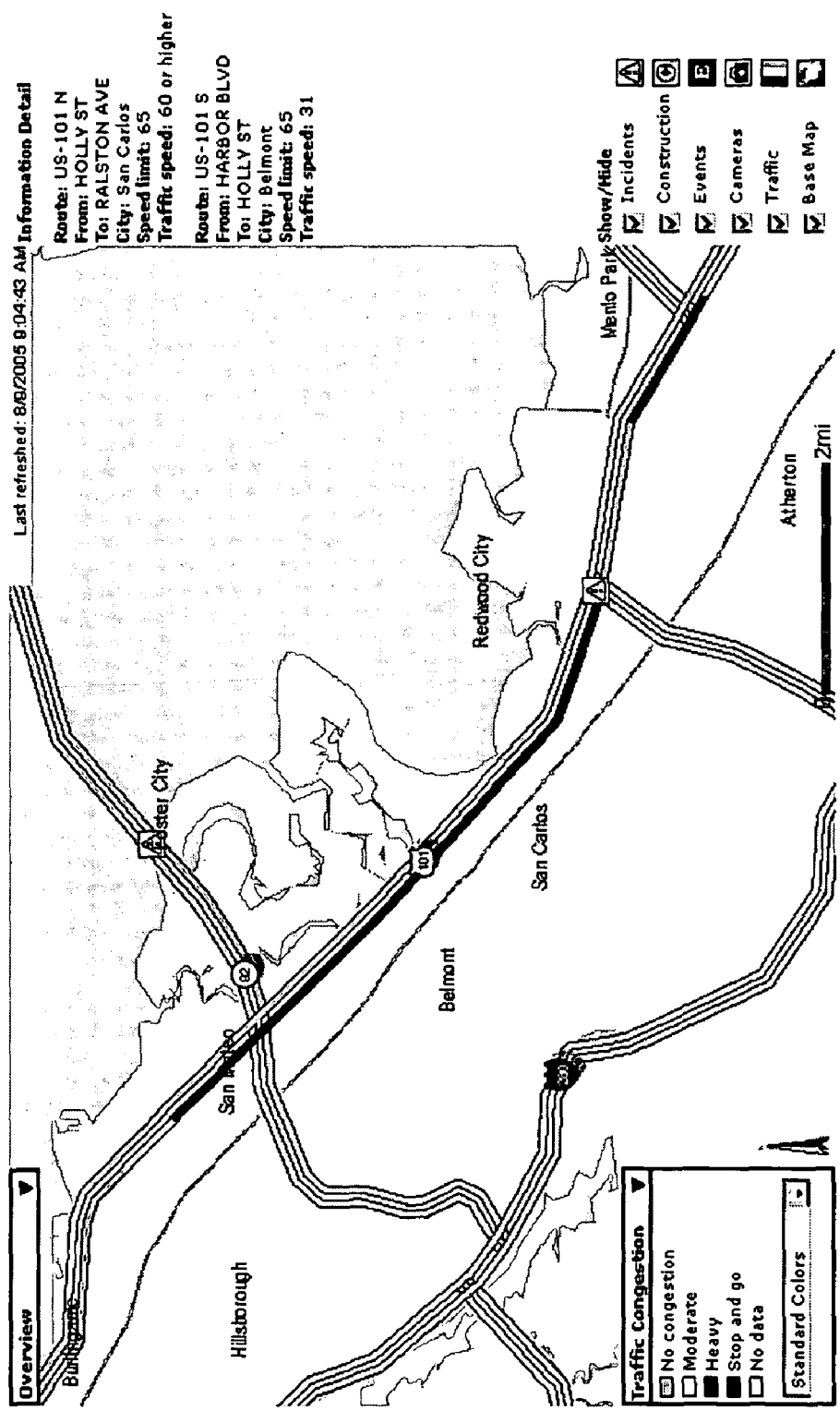

FIG. 7b illustrates the process of reaching the edit window 701 (FIG. 7a) in one exemplary embodiment of the interface 700. A menu 707 initially displays multiple user options (e.g., "view" 708 and "settings" 709). When the option "view" 708 is selected by the user, a sub-menu 710 showing options for viewing all 711 or each of the routes 712-715 stored on the device is displayed. When the option "settings" 709 is selected, a sub-menu 716 showing the existing profiles 717-719 and the option to create a new profile 720 is displayed. When "Create New Profile" 720 is selected, a window similar to edit window 701 may be displayed to allow the user to create a new profile. In the illustration of the present embodiment in FIGS. 7a-7b, when "Profile 1" 717 is selected by the user, sub-menu 721 showing options "Edit" 722 and "Delete" 723 is displayed. When "Edit" option 722 is selected, edit window 701 of FIG. 7a is displayed. When "Delete" option is selected, the profile "Profile 1" is deleted.

It will be obvious to those skilled in the art that the interface 700 as illustrated in FIGS. 7a-b may be implemented in many alternate ways. For example, any sub-menu may be displayed as the menu. In addition, instead of displaying a window similar to edit window 701 to create a new profile, a user may be asked to fill in different parameters in creating a profile through a series of pop-up windows. Hence, the present invention should not be limited to the examples shown in the illustrated embodiment of the interface 700 in FIGS. 7a-b.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. The present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method of displaying traffic information, comprising:
 generating a graphical interface for display on an integrated display of a portable device, the graphical interface including information related to traffic routes;
 displaying a traffic route bar that represents a total distance of a first traffic route, the traffic route bar displayed without a simultaneous display on the integrated display of a road map of a geographic region that includes the first traffic route;
 displaying segments of the traffic route bar, each segment of the traffic route bar representing a corresponding range of real-time traffic speeds along the first traffic route, and each segment located on the traffic route bar in approximate proportion to where the corresponding range of the real-time traffic speeds occurs along the first traffic route;

enabling scrolling from one segment of the traffic route bar to a next segment of the traffic route bar by turning an input control; and updating the segments of the traffic route bar to represent real-time changes in the real-time traffic speeds along the first traffic route, the real-time changes in the real-time traffic speeds measured by one or more speed sensors.

2. The method of claim 1, further comprising representing each segment of the traffic route bar by a corresponding color.

3. The method of claim 1, further comprising representing each segment of the traffic route bar by a corresponding symbol.

4. The method of claim 1, further comprising displaying a user-defined name of the first traffic route in the graphical interface and proximate the traffic route bar to identify the traffic route bar.

5. The method of claim 1, further comprising displaying a symbol to indicate an overall status of traffic movement along the first traffic route, the symbol displayed in the graphical interface.

6. The method of claim 1, further comprising displaying markers to identify locations on the traffic route bar with corresponding locations along the first traffic route.

7. The method of claim 1, further comprising displaying a focus of a first segment of the traffic route bar, the focus displayed in the graphical interface to highlight the first segment of the traffic route bar.

8. The method of claim 7, further comprising:
receiving a user input associated with the focus that is displayed in the graphical interface to highlight the first segment of the traffic route bar; and
changing the focus to a second segment of the traffic route bar responsive to the user input, the focus displayed in the graphical interface to highlight the second segment of the traffic route bar.

9. The method of claim 7, further comprising displaying detailed information about the focus in a focus box that is displayed in the graphical interface with the focus that highlights the first segment of the traffic route bar.

10. The method of claim 1, further comprising:
displaying an additional traffic route bar that represents a total distance of a second traffic route, the additional traffic route bar displayed without an additional road map of the geographic region that includes the first traffic route and the second traffic route; and
displaying segments of the additional traffic route bar, each segment of the additional traffic route bar representing a corresponding range of real-time traffic speeds along the second traffic route, and each segment located on the additional traffic route bar in approximate proportion to where the corresponding range of the real-time traffic speeds occurs along the second traffic route.

11. The method of claim 10, wherein the additional traffic route bar is displayed in the graphical interface on the integrated display of the portable device along with the traffic route bar.

12. The method of claim 10, further comprising displaying a different user-defined name of the second traffic route in the graphical interface and proximate the additional traffic route bar to identify the additional traffic route bar.

13. The method of claim 1, further comprising displaying an additional graphical interface to display user-selectable options for creating custom traffic routes.

14. The method of claim 13, further comprising displaying the additional graphical interface to name each of the custom traffic routes and to name a category of routes for each of the custom traffic routes.

15. The method of claim 1, further comprising displaying an additional graphical interface to set up user-profiles.

16. A computer-implemented method comprising:
receiving a request from a client device for traffic route data that corresponds to a traffic route;
requesting the traffic route data for the traffic route and receiving the traffic route data from a traffic information server;
generating a graphical user interface to display the traffic route data on an integrated display of the client device, the graphical user interface comprising a traffic route bar that represents a total distance of a traffic route, the traffic route bar displayed without a simultaneous display on the integrated display of a road map of a geographic region that includes the traffic route, the traffic route bar divided into segments that each represent a corresponding real-time traffic speed along the traffic route, each segment located on the traffic route bar in approximate proportion to where the corresponding real-time traffic speed occurs along the traffic route, and each segment of the traffic route bar configured to be updated to represent real-time changes in the corresponding real-time traffic speeds, the real-time changes in the real-time traffic speeds measured by one or more speed sensors;
enabling scrolling from one segment of the traffic route bar to a next segment of the traffic route bar by turning an input control; and
transmitting the graphical user interface to the client device for display.

17. A computing device comprising:
at least a memory and a processor to render a user interface on an integrated display of the computing device, the user interface configured to display:
traffic information related to traffic routes;
a traffic route bar that represents a total distance of a traffic route, the traffic route bar displayed without a simultaneous display on the integrated display of a road map of a geographic region that includes the traffic route, the traffic route bar divided into segments that each represent a corresponding real-time traffic speed along the traffic route, each segment located on the traffic route bar in approximate proportion to where the corresponding real-time traffic speed occurs along the traffic route, and each segment of the traffic route bar configured to be updated to represent real-time changes in the corresponding real-time traffic speeds, the real-time changes in the real-time traffic speeds measured by one or more speed sensors;
a user-defined name of the traffic route displayed in the user interface proximate the traffic route bar to identify the traffic route bar; and
a symbol displayed in the user interface to indicate an overall status of traffic movement along the traffic route, and the user interface enabling scrolling from one segment of the traffic route bar to a next segment of the traffic route bar by turning an input control.

18. A portable device for displaying traffic information, the portable device comprising:
at least a memory and a processor to implement a traffic information application that includes a graphical interface which includes the traffic information related to traffic routes;

an integrated display configured to display the graphical interface and the traffic information as:

a traffic route bar that represents a total distance of a traffic route, the traffic route bar displayed without a simultaneous display on the integrated display of a road map of a geographic region that includes the traffic route; and segments of the traffic route bar, each segment of the traffic route bar representing a corresponding range of real-time traffic speeds along the traffic route, each segment located on the traffic route bar in approximate proportion to where the corresponding range of real-time traffic speeds occurs along the traffic route, and each segment configured to be updated to represent real-time changes in the corresponding range of real-time traffic speeds, the real-time changes in the real-time traffic speeds measured by one or more speed sensors;

a user-defined name of the traffic route displayed proximate the traffic route bar to identify the traffic route bar;

a symbol displayed to indicate an overall status of traffic movement along the traffic route; and the user interface enabling scrolling from one segment of the traffic route bar to a next segment of the traffic route bar by turning an input control.

19. A computer-readable storage media device, the computer-readable storage media device not comprising a signal, and the computer-readable storage media device comprising program code that is executable stored thereon and, responsive to executing the program code, a computer device implemented as a portable device with an integrated display:

generates a graphical interface to display information related to traffic routes;

displays a traffic route bar that represents a total distance of a traffic route, the traffic route bar displayed without a simultaneous display on the integrated display of a road map of a geographic region that includes the traffic route;

displays segments of the traffic route bar, each segment of the traffic route bar representing a corresponding range of real-time traffic speeds along the traffic route, each segment located on the traffic route bar in approximate proportion to where the corresponding range of the real-time traffic speeds occurs along the traffic route, and each segment of the traffic route bar configured to be updated to represent real-time changes in the corresponding range of the real-time traffic speeds, the real-time changes in the real-time traffic speeds measured by one or more speed sensors; and enables scrolling from one segment of the traffic route bar to a next segment of the traffic route bar by turning an input control.

* * * * *